United States Patent [19]

Ito et al.

[11] 4,390,167
[45] Jun. 28, 1983

[54] APPARATUS FOR REMOVING TORCH-CUTTING SLAG OF SLAB

[75] Inventors: Susumu Ito; Sadayuki Saito, both of Chiba; Kazuya Higuchi, Ichihara, all of Japan

[73] Assignee: Kawasaki Steel Corporation, Hyogo, Japan

[21] Appl. No.: 335,716

[22] Filed: Dec. 29, 1981

[51] Int. Cl.³ .............................................. B23K 7/02
[52] U.S. Cl. ...................................... 266/48; 266/49; 266/50
[58] Field of Search ............................... 266/48, 49, 50

[56] References Cited

U.S. PATENT DOCUMENTS 4,329,187  5/1982  Ushioda et al. ........................ 266/49
4,336,078  6/1982  Radtke .................................. 266/49

*Primary Examiner*—W. Stallard
*Attorney, Agent, or Firm*—Koda and Androlia

[57] ABSTRACT

Apparatus for removing a torch-cutting slag of a slab, wherein a cutting tool mount vertically and rotatably controllable is transversely racked beneath a conveying roller table for conveying the slab fusion-cut to a predetermined length in a direction perpendicular to the conveying roller table, and cutting tools for cutting the torch-cutting slag of the slab are provided at least at positions symmetrical with each other along the longitudinal outer surfaces of the cutting tool mount. The cutting tools for cutting the torch-cutting slag are constituted by a plurality of cutting tools arranged in succession from the center of the forward portion, i.e., the input side, to opposite sides of the rear portion of the cutting tool mount, the cutting tools are gradually increased in the level of projection from the forward portion to the rear portion on the cutting tool mount and are resiliently supported on the cutting tool mount through springs.

4 Claims, 13 Drawing Figures

APPARATUS FOR REMOVING TORCH-CUTTING SLAG OF SLAB

This invention relates to an apparatus for cutting and removing a molten slag developing and adhering to the undersurface of a slab, when a belt-shaped steel stock produced by a sequential continuous-casting system and the like is fusion-cut by a torch into slabs each having a predetermined length.

For example, an ingot produced by a sequential continuous-casting system is fusion-cut into slabs each having a predetermined length, and, molten slag developed during torch cutting adhere to the undersurface of the slabs to form so-called torch dross.

As the slab adhered thereto with the torch-cutting slags commonly called torch dross is hot rolled, bite-in flaws on the rolling rolls, lamination flaws on the surfaces of a rolled product and the like tend to occur, so that it is necessary to remove the torch-cutting slag during the step of conveying the thus fusion-cut slab.

Heretofore, as an apparatus for removing the aforesaid torch-cutting slag, there has been proposed an apparatus in which a cutting tool mount vertically movable by a fluid pressure cylinder is provided beneath a space formed between the rollers disposed at desirable positions of a conveying roller table for the slab fusion-cut to a predetermined length in a direction perpendicular to the conveying roller table, and cutting tools for cutting the torch-cutting slag of the slab are provided on the aforesaid cutting tool mount.

In this conventional apparatus, sometimes, such cases take place that the torch-cutting slag thus cut and removed by the cutting tools adheres onto the cutting tools, and, when the torch-cutting slag to be cut and removed for a second time, the cutting tools do not perfectly fit to the slab, thus unabling to completely cut and remove the torch-cutting slag.

These cases tend to occur when the torch-cutting slag of the slab, the surface of which is heated to a high temperature of above 500° C., is cut and removed.

Furthermore, a scale layer is normally formed on the surface of the slab and, during cutting removal of the torch-cutting slag, the scales are peeled off and accumulated around the cutting tools, so that the cutting tools cannot perfectly fit to the slab in the same manner as described above.

On the other hand, the work of cutting and removing the torch-cutting slag, depending on the casting speed of the slab though, is normally performed at the rate of a cycle of one slab for one or two minutes, and the period of time of contact between each cutting tool and the high temperature slab amounts to 20% or more of the total contact time between all of the cutting tools and the slab.

As a result, due to the heat fatigue caused to cutting tools during this period of time, the service life of the cutting tools is reduced, and in fact, in the conventional apparatus, the cutting tools have been required to be replaced with new ones more than once for a week of operation.

To further state, as described in Japanese Utility Model "Kokai" (Laid-Open) No. 64139/79, the conventional torch-cutting slag removing apparatus adopting the method of cutting the torch-cutting slag by use of cutting tools is constructed such that the respective cutting tools are spaced apart a desired interval from each other from the center of the forward portion to the opposite sides of the rear portion of the upper surface of the cutting tool mount vertically movable by a fluid pressure cylinder, and further, the cutting tools are arranged from the forward portion toward the rear portion on the cutting tool mount one after another with the end portions of the adjacent cutting tools overlapping with one another, and the respective cutting tools are gradually reduced in the level of projection from the center to the opposite sides.

In this conventional apparatus, the respective cutting tools are gradually reduced in the level of projection from forward to rearward, and hence, this apparatus is disadvantageous in that the torch-cutting slag of the slab cannot be cut when the opposite end portions of the slab are upwardly cambered in the widthwise direction thereof.

SUMMARY OF THE INVENTION

The present invention has an object to obviate the abovedescribed disadvantages or problems of the prior art, and contemplates to provide an apparatus for removing the torch-cutting slag of a slab, wherein the cutting tools are constantly maintained in a clean state to highly fit the cutting tools to the slab, so that the torch-cutting slag can be completely cut and removed, the service life of the cutting tools can be extended, and, when the slab is upwardly cambered in the widthwise direction thereof, the torch-cutting slag can be uniformly and positively cut over the entire width.

More specifically, the first invention contemplates to provide an apparatus for removing the torch-cutting slag of a slab, wherein a roll-shaped cutting tool mount vertically and rotatably controllable is transversely racked beneath a space formed between rollers disposed at desirable positions of a conveying roller table for conveying the slab fusion-cut to a predetermined length in a direction perpendicular to the conveying roller table, and cutting tools for cutting and removing the torch-cutting slag of the slab are provided at least at positions symmetrical with each other along the longitudinal outer surfaces of the cutting tool mount.

In the above arrangement, it is desirable that there are provided restraining means adapted to engage opposite outer surfaces of the cutting tool mount at elevated position of the cutting tool mount for controlling the rotation of the cutting tool mount during cutting of the torch-cutting slag, thereby enabling to reliably control the position of the roll-type cutting tool mount during cutting operation.

Furthermore, the second invention can provide an apparatus for removing the torch-cutting slag of a slab, wherein, in a step of conveying the slab fusion-cut to a predetermined length, in order to cut the torch-cutting slag of the slab, the respective cutting tools arranged in succession from the center of the forward portion, i.e. the input side, to the opposite sides of the rear portion on the cutting tool mount vertically movable are gradually increased in the level of projection from the forward portion to the rear portion and the respective cutting tools are supported on the cutting tool mount through springs loaded under the respective cutting tools.

According to the second invention, the respective cutting tools are gradually increased in the level of projection from forward to rearward, so that, when the slab is upwardly cambered in the widthwise direction thereof, the torch-cutting slag can be uniformly and positively cut over the entire width.

BRIEF DESCRIPTION OF THE ATTACHED DRAWINGS

DESCRIPTION OF THE PREFERRED EMBODIMENTS

Description will hereunder be given of the embodiments of the present invention with reference to the accompanying drawings.

Figure 1:
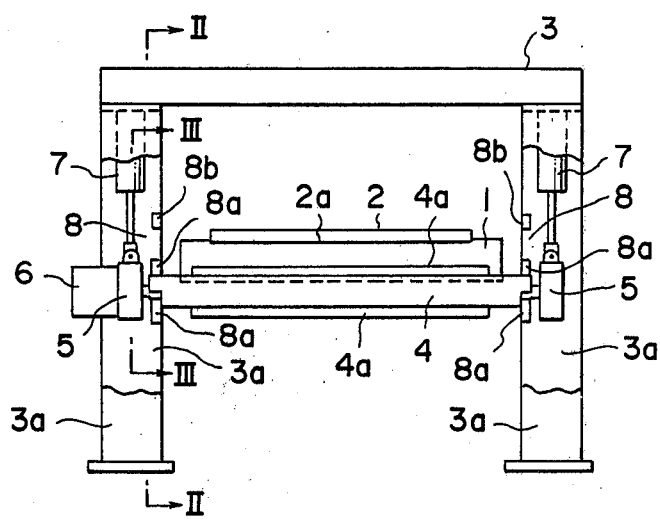
FIG. 1 is a partially cut-away front view showing one embodiment of the apparatus according to the present invention.
Figure 2:
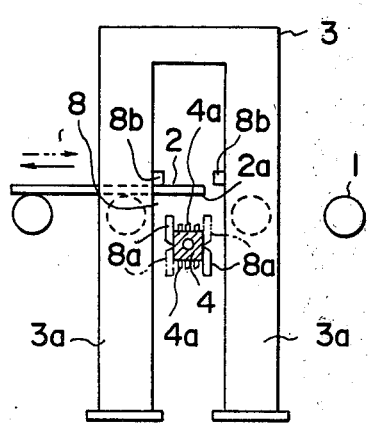
FIG. 2 is a sectional view taken along the line II—II in FIG. 1.
Figure 3:
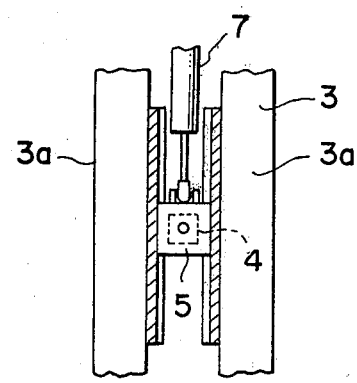
FIG. 3 is a sectional view taken along the line III—III in FIG. 1.

In FIGS. 1 through 3, designated at reference numeral 1 is a roller table for conveying a slab 2 fusion-cut to a predetermined length, to a heating furnace for example, and a gate-like framework 3 bridged over the roller table 1 is provided between rollers desirably positioned in this roller table 1.

A roll-shaped cutting tool mount 4 positioned beneath a space formed by rollers and perpendicularly intersecting the direction of the roller table 1 is racked rotatably through bearings 5 between spaces formed by two pair of front and rear studs 3a which are provided at opposite sides of this gate-like framework 3.

Cutting tools 4a for cutting the torch-cutting slag 2a are detachably provided on the longitudinal outer surface of this cutting tool mount 4 at least two positions symmetrical with each other and spaced apart from each other through 180°.

The cutting tool mount 4 is rotatably controlled through 180° for example through the action of rotary driving means 6 such as a fluid pressure type or an electrically driven type one, and the torch-cutting slag 2a is cut by the alternate use of the cutting tools 4a provided at two positions symmetrical with each other and spaced apart from each other through 180° on the cutting tool mount 4.

Additionally, the bearings 5 of the cutting tool mount 4 are vertically movably provided in the spaces formed by the pair of front and rear studs 3a provided at the opposite sides of the gate-like framework 3 and adapted to be vertically movably controlled by a fluid pressure cylinder 7, thereby enabling to vertically move the cutting tool mount 4.

More specifically, as the cutting tool mount 4 rises, the edge of the cutting tool 4a projects into a pass line of the slab 2, to thereby perform cutting of the torch-cutting slag 2a, and, after the torch-cutting slag 2a has been cut away, the cutting tool mount 4 is lowered to cause the edge of the cutting tool 4a to descend to a position below the pass line, the cutting tool mount 4 is rotatably controlled by the rotary driving means 6 to cut the torch-cutting slag 2a of the succeeding slab 2, the latter cutting tool 4a at the position symmetrical with the former is elevated upwardly, and again, the cutting tool mount 4 is upwardly movably controlled by the fluid pressure cylinder 7.

Such restraining means 8 are provided that, when the cutting tool mount 4 reaches the elevated position, the outer surfaces at the opposite ends of the cutting tool mount 4 engage the studs 3a of the gate-like framework 3, so that the rotation of the cutting tool mount 4 can be controlled when the torch-cutting slag 2a is cut.

It is preferable that this rotation restraining means 8 comprises stoppers 8a provided on the outer surfaces at the opposite ends of the cutting tool mount 4 and stopper receivers 8b provided on the respective studs 3a, as shown in FIG. 2.

As another example of the rotation restraining means for the cutting tool mount 4, a fluid pressure type brake device, an electromagnetic brake device or the like may be adopted, however, when one of these types is used, a considerably large brake device is required because an impact force is high in value during cutting. Thus, it is most preferable to use the rotation restraining means 8 comprising the stoppers 8a and the stopper receivers 8b bearable an impact force high in value.

In addition, the cutting tool mount 4 may be of a circular shape in the transverse cross section, however, a regular polygonal shape as shown in FIG. 2 may be more preferable.

Figure 4:
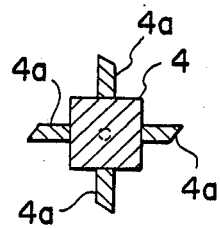
FIGS. 4 and 5 are sectional views showing examples of sectional shapes of the cutting tool mounts and the mounted states of cutting tools, respectively.
Figure 5:
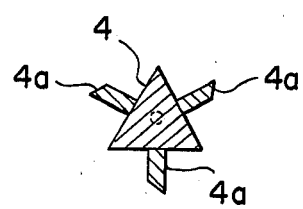

The cutting tools 4a may be respectively provided on the longitudinal outer surfaces of the cutting tool mount 4 being of a regular square shape in cross section as shown in FIG. 4, or the cutting tools 4a may be respectively provided on the longitudinal outer surfaces of the cutting tool mount 4 being of a regular triangular shape in cross section as shown in FIG. 5.

Figure 6:
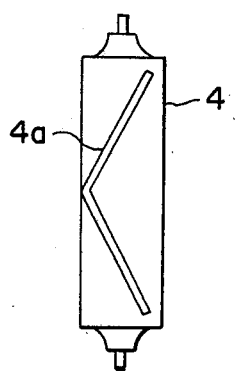
FIGS. 6 and 7 are plan views showing examples of arrangements of the cutting tools on the cutting tool mounts, respectively.
Figure 7:
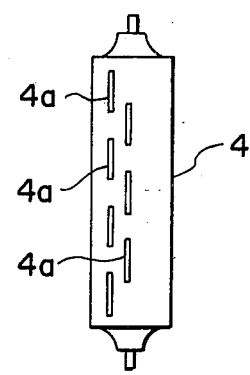

Further, each of the cutting tools 4a may be of an integral bodycorresponding to the width of the slab 2 as shown in FIG. 6, however, it is more preferable that, without being formed into a single and long body, the cutting tool 4a is divided into several cutting portions arranged on the longitudinal outer surface of the cutting tool mount 4 as shown in FIG. 7 because the impact force acting on the cutting tool 4a can be reduced in value in doing so.

Furthermore, normally, to cut and remove the torch-cutting slag, the roller table 1 for conveying the slab 2 is rotatably controlled in the normal and the opposite directions to reciprocate the slab 2 in the directions indicated by an arrow of a solid line and another arrow of a chain line in FIG. 2, and the cutting tool mounts 4 having the cutting tools 4a are provided at positions symmetrical with and spaced apart a desired distance from each other in front and at the back along the direction of travel of the slab 2, so that the torch-cutting slag 2a on the undersurface of the opposite ends of the slab 2 can be cut for removal. However, as shown in FIG. 8 for example, on the cutting tool mount 4 being of a regular square in cross section, one pair of cutting tools 4a having the edges in one direction are provided at positions symmetrical with each other through 180° on the cutting tool mount 4 and the other pair of cutting tools 4a having the edges in the other direction are provided at other positions symmetrical with each other through 180° on the cutting tool mount 4, whereby one torch-cutting slag removing device is sufficient, so that it is highly preferable from the viewpoint of saving the installation space and installation cost.

In this case, as indicated by chain lines in FIG. 2, stopper receivers 8b engageable with the stoppers 8a provided on opposite side surfaces at the opposite ends of the cutting tool mount 4 need be provided on the studs 3a at the other sides.

Figure 8:
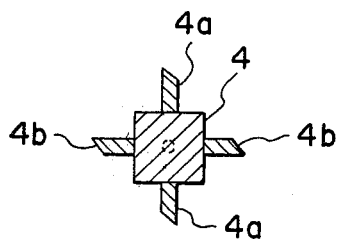
FIG. 8 is a sectional view showing an example where the cutting tools having edges different in directions are mounted on the cutting tool mount.

Further, in the cases of the examples shown in FIGS. 4, 5 and 8, needless to say, it is required that the rotary driving means 6 for the cutting tool mount 4 be suitably controlled to cause the desired cutting tools 4a or 4b to project into the pass line.

Furthermore, it may be intended that, for example, water under high pressure is blown against the cutting tools 4a or 4b, which have cut the torch-cutting slag 2a away, to thereby remove the torch-cutting slag, scales and the like therefrom.

A roll-shaped cutting tool mount vertically and rotatably controllable is transversely racked beneath a space formed between rollers disposed at desirable positions on a conveying roller table for the slab fusion-cut to a predetermined length in a direction perpendicular to the conveying roller table, cutting toolsfor cutting and removing the torch-cutting slags of the slab are provided at least at positions symmetrical with each other along the longitudinal outer surfaces of the cutting tool mount, and, restraining means are provided, which, when the cutting tool mount reaches the elevated position, engage the outer surfaces at the opposite ends of the cutting tool mount, to thereby control the rotation of the cutting tool mount when the torch-cutting slag is cut, whereby, as the cutting tool mount is lowered, the cutting tools are rotated, so that the torch-cutting slag, scales and the like, which have been accumulated on the cutting tool mount, can be dropped for removal to constantly maintain the cutting tools in a clean state, thereby enabling to achieve perfect fitness between the cutting tool and the slab to completely cut the torch-cutting slag for removal.

In addition, the alternate use of the cutting tools decreases the heat fatigue so as to contribute to the extension of the service life of the cutting tools and to continue the work of cutting the torch-cutting slag by use of the other cutting tool even when one cutting tool is damaged, so that necessity for the replacement of the cutting tool with new one can be eliminated during casting, thus enabling to contribute to improved productivity.

Further, the provision of two pairs of cutting tools different in direction of edge from each other can eliminate the necessity for providing torch-cutting slag removing devices disposed at positions symmetrical with each other and spaced apart a desired distance from each other in front and at the back along the direction of travel of the slab, so that only one torch-cutting slag removing device is sufficient, thereby enabling to contribute to saving of the installation space, the installation cost and the like.

Moreover, the provision of the restraining means engageable with the outer surfaces on the opposite ends of the cutting tool mount at the elevated position of the cutting tool mount can control the rotation of the cutting tool mount during cutting of the torch-cutting slag, whereby necessity for using an expensive brake device of a fluid pressure type, an electromagnetic type or the like is eliminated, so that only an engagement type one which is most simplified in construction and can bear a high impact force is sufficient without requiring the use of an extra control means, thereby enabling to reliably control the rotation of the cutting tool mount and to save the installation cost and the like to a considerable extent.

FIGS. 9 through 13 show embodiments of the second invention of the present invention.

Figure 9:
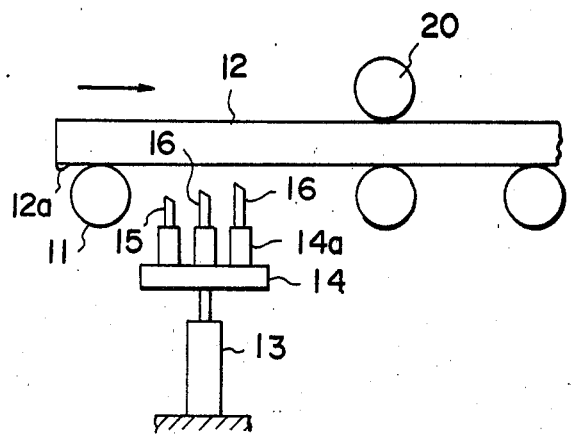
FIG. 9 is a schematic sideview showing one embodiment of the apparatus according to the present invention.

In FIG. 9, reference numeral 11 is a roller table for conveying a slab 12 fusion-cut to a predetermined length, to a hot rolling mill for example, and a cutting tool mount 14 vertically movable by a fluid pressure cylinder 13 is provided beneath a space formed between rollers desirably positioned on this roller table 11.

Figure 10:
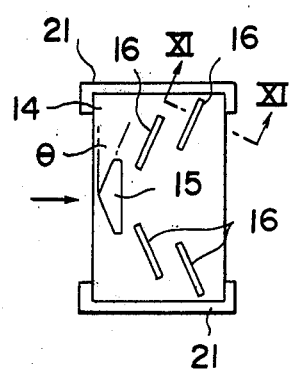
FIG. 10 is a schematic plan view showing an arrangement of cutting tools on the cutting tool mount.
Figure 11:
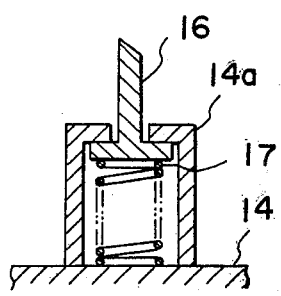
FIG. 11 is a sectional view, on an enlarged scale, taken along the line XI—XI in FIG. 10, showing the details of a cutting tool holder.

As shown in FIGS. 10 and 11, a cutting tool 15 being of an angular shape as viewed in plan view and having a sweepback angle $\theta$ of 3 to 10 degrees for example, preferably about 5 degrees is provided in the center of the forward portion, i.e. the input side of the slab, of the upper surface of the cutting tool mount 14, with edge of the cutting tool 15 being held upwardly by a holder 14a affixed onto the cutting tool mount 14.

Furthermore, on the upper surface of the cutting tool mount 14, respective cutting tools 16, following the cutting tool 15 disposed in the center of the forward portion, are provided at opposite sides of the rear portion of the cutting tool mount 14, being arranged at desired intervals, overlapped at end portions adjacent with each other and substantially in parallel to respective sides of the cutting tool 15 provided in the center of the forward portion, with the edges of the cutting tools being held upwardly by the holders 14a, respectively.

The edges of the cutting tools 15 and 16 are gradually increased in height from the forward portion toward the rear portion of the cutting tool mount 14 by about 3 to 5 mm for example.

The cutting tools 15 and 16 held by the holders 14a, respectively, are suitably urgedly abutted against the undersurface of the slab 12 through the resilient forces of springs 17 loaded in the lower portions in the respective holders 14a, and, even if the slab 12 is cambered in the widthwise direction thereof, the cutting tools 15 and 16 can cut the torch-cutting slag 12a.

Figure 12:
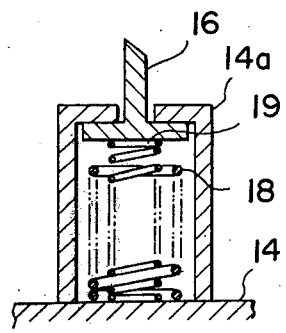
FIG. 12 is a sectional view showing another example of the cutting tool holder.

Further, as another example, as shown in FIG. 12, the cutting tools 15 and 16 held by the holders 14a, respectively, are suitably urgedly abutted against the undersurface of the slab 12 through the resilient forces of springs 18 beingrelatively strong in resiliency and disposed at the lower portions in the respective holders 14a and other springs 19 disposed above the springs 18 and relatively weak in resiliency and, the torch-cutting slag 12a formed on the undersurface may be cut away through the resilient force of the springs 18 being stronger in resiliency.

In this case, it is desirable that the springs 18 being stronger in resiliency in the holders 14a have smaller lengths in inverse proportion to the cutting tools having higher edges, against which the springs 18 are abutted, however, the springs 19 being weaker in resiliency have larger length in proportion to the cutting tools having higher edges, whereby, when the cutting tools abut against the slab 12, which is downwardly cambered in the widthwise direction thereof, high impact forces acting on the cutting tools having the higher edges can be lightened.

Figure 13:
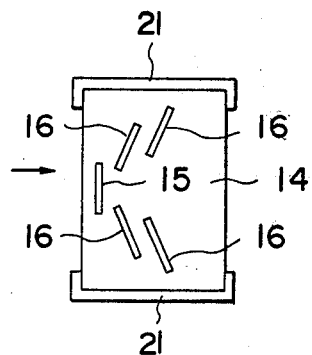
FIG. 13 is a schematic plan view showing another arrangement of cutting tools on the cutting tool mount.

In addition, the cutting tool 15 provided in the center of the forward portion may have a straight-lined edge similar to those of the other cutting tools 16 and be disposed perpendicularly to the direction of travel of the slab 12 as shown in FIG. 13, and further, the respective cutting tools 15 and 16 may be formed into double-edged ones.

Further, when the torch-cutting slag 12a of the slab 12 is cut by the cutting tools 15 and 16, if the slab 12 is relatively light in weight, then there may be such dangers that the slab 12 floats up from the surface of the roller table 11 and the cutting tools 15 and 16 are unsuitably abutted against the slab 12 to very the posture of the slab 12. Therefore, to avoid these dangers, it is desirable to provide a hold-down roller 20 for the slab 12 as shown in FIG. 9.

Additionally, designated at 21 in FIGS. 10 and 13 are guides for vertically moving the cutting tool mount 14.

As described above, according to the second invention, in the step of conveying the slab fusion-cut to a predetermined length, in order to cut the torch-cutting slag of the slab, the respective cutting tools arranged in succession on the cutting tool mount from the center of the forward portion, i.e. the input side of the slab, to the opposite sides of the rear portion of the cutting tool mount are gradually increased in the level of projection from the forward portion toward the rear portion, so that, even if the slab is cambered upwardly in the widthwise direction thereof, the torch-cutting slag over the entire width of the slab can be uniformly and positively cut.

Furthermore, the respective cutting tools are supported on the cutting tool mount through the springs provided under the respective cutting tools, whereby forces for allowing the cutting tools to suitably abut against the slab are rendered to the respective cutting tools by the springs, so that the respective cutting tools can be protected and the torch-cutting slag can be smoothly cut even if the slab is cambered in the widthwise direction thereof.

Needless to say, the apparatus according to the second invention is applicable to a case of removing scales formed on the upper, bottom and side surfaces of the slab, and, in this case,, the cutting tool mounts provided thereon with the cutting tools, respectively, may be provided in opposed relation to the upper, bottom and side surfaces of the slab, respectively.

In the case of removing the torch-cutting slag or the scales, the roller table for conveying the slab is rotatably controlled in the normal and opposite directions to reciprocate the slab, the cutting tool mounts provided thereon with the cutting tools are provided at positions symmetrical with each other, at a desired interval in front and at the back along the direction of travel of the slab.

As has been described hereinabove, the apparatus for removing a torch-cutting slag of a slab according to the present invention is suitable for being installed on slab working process lines in iron works as the apparatuses for cutting and removing torch-cutting slags of slabs produced through fusion-cutting of a belt-like steel material from a sequential continuous-casting system and the like.

What is claimed is:

1. Apparatus for removing a torch-cutting slag of a slab, wherein in cutting tool mount vertically and rotatably controllable is transversely racked beneath a space formed between rollers disposed at desirable positions of a conveying roller table for conveying the slab fusion-cut to a predetermined length in a direction perpendicular to the conveying roller table, and cutting tools for cutting and removing the torch-cutting slag of the slab are provided at least at positions symmetrical with each other along the longitudinal outer surfaces of the cutting tool mount.

2. Apparatus for removing a torch-cutting slag of a slab as set forth in claim 1, wherein restraining means adapted to engage opposite outer surfaces of said cutting tool mount at elevated position of said cutting tool mount are provided for controlling the rotation of said cutting tool mount during cutting of the torch-cutting slag.

3. Apparatus for removing a torch-cutting slag of a slab as set forth in claim 1, wherein said cutting tool mount is of a regular square shape in cross section, while one pair of cutting tools opposite to each other and the other pair of cutting tools opposite to each other in edge direction are provided on opposing outer surfaces in one direction and those in the other direction, of said cutting tool mount.

4. Apparatus for removing a torch-cutting slag of a slab, wherein in a step of conveying a slab fusion-cut to a predetermined length, in order to cut said torch-cutting slag, a plurality of cutting tools are arranged in succession from the center of the forward portion, i.e., the input side, to opposite sides of the rear portion on a cutting tool mount vertically movable, said cutting tools are gradually increased in the level of projection from the forward portion to the rear portion of the cutting tool mount and are supported on said cutting tool mount through springs loaded under said respective cutting tools.

* * * * *